(12) United States Patent
Aggarwal

(10) Patent No.: US 6,775,298 B1
(45) Date of Patent: Aug. 10, 2004

(54) DATA TRANSFER MECHANISM FOR HANDHELD DEVICES OVER A WIRELESS COMMUNICATION LINK

(75) Inventor: Gaurav Aggarwal, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/372,928

(22) Filed: Aug. 12, 1999

(51) Int. Cl.[7] .................................................. H04J 3/24
(52) U.S. Cl. ..................................... 370/473; 370/219
(58) Field of Search ................................ 370/473, 474, 370/310, 449; 709/219, 230, 236

(56) References Cited

U.S. PATENT DOCUMENTS

| | | | |
|---|---|---|---|
| 642,758 A | * | 2/1900 | Teng |
| 5,594,490 A | * | 1/1997 | Dawson et al. ................. 348/6 |
| 6,012,159 A | * | 1/2000 | Fischer et al. ............... 714/755 |
| 6,272,658 B1 | * | 8/2001 | Steele et al. ................. 714/752 |

* cited by examiner

Primary Examiner—Wellington Chin
Assistant Examiner—Brenda Pham
(74) Attorney, Agent, or Firm—Whitham, Curtis & Christofferson, P.C.; T. Rao Coca

(57) ABSTRACT

A method and apparatus for transferring data between a handheld device and a network over a wireless communications link. A datapool manager breaks files into virtual blocks and adds the virtual blocks to a datapool. A communications manager converts the virtual blocks into transportation packets and controls the transfer of the transportation packets between the handheld device and the network. After a transportation packet is transferred, an acknowledgment is returned indicating that the transfer was successful. If the transfer of a file is interrupted, then, upon reestablishing the wireless link, only those transportation packets for which an acknowledgment has not been returned are transferred. To properly reconstruct the file, a pointer indicates the location of each transportation packet in the file. Furthermore, to enable the use of a partially transferred file, a table of information is maintained indicating the validity of the partially transferred file. Transportation packets are identified as instruction packets or data packets. When determining the order of transfer, priority is placed on the transfer of instruction packets.

28 Claims, 7 Drawing Sheets

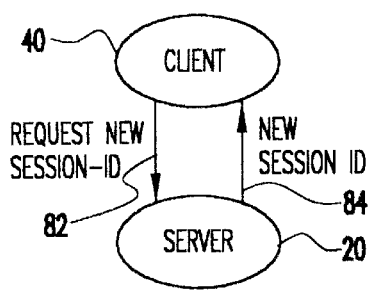 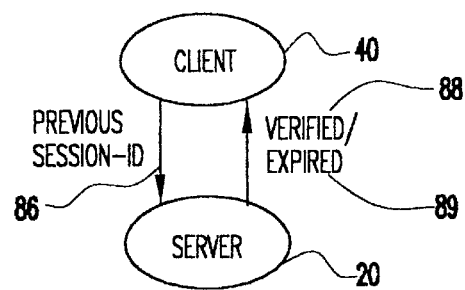
FIG.3A        FIG.3B
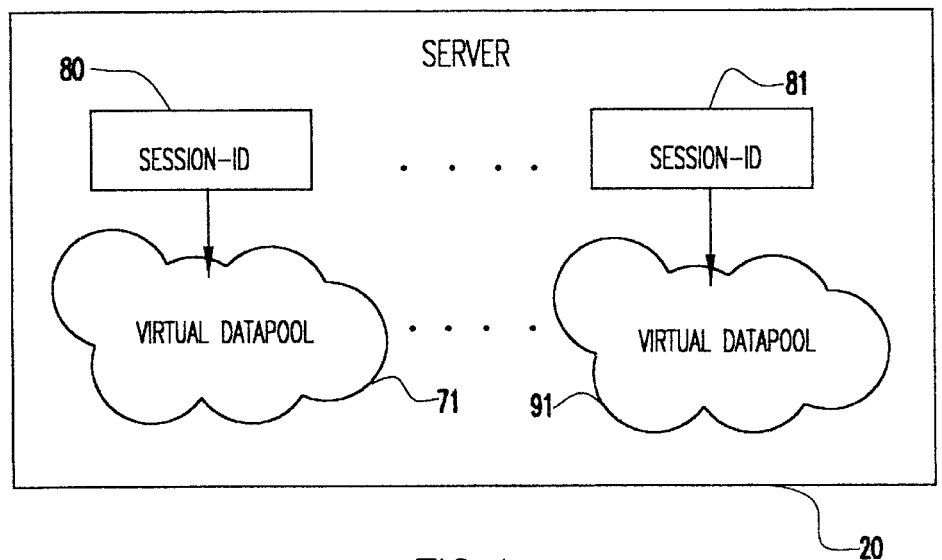
FIG.4

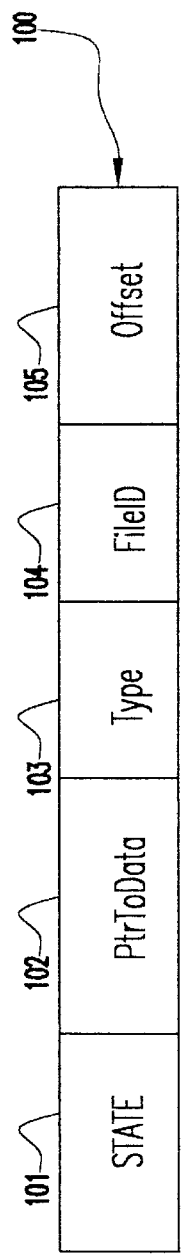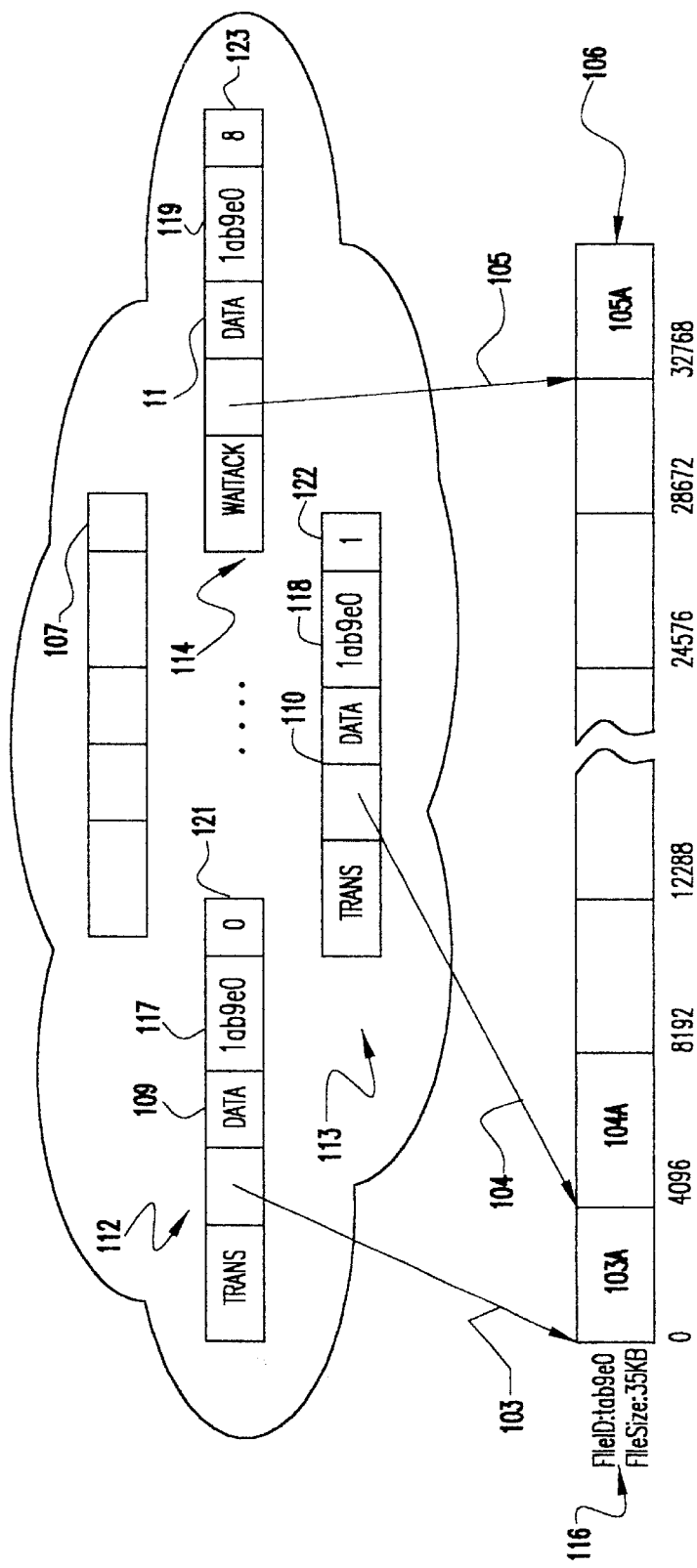

DATA TRANSFER MECHANISM FOR HANDHELD DEVICES OVER A WIRELESS COMMUNICATION LINK

BACKGROUND OF THE INVENTION

1. Field of the Invention

The present invention generally relates to a wireless communication link between handheld devices and network for accessing data and, more particularly, to a data transfer mechanism well suited for handheld devices with small memory sizes and restricted processor speeds.

2. Background Description

The past few years have seen a considerable reduction in the cost of computer systems. This coupled with the exponential decrease in size of microprocessors and memories along with rapid progress in VLSI (Very Large Scale Integrated) technology has resulted in a huge market for handheld devices. Smart-phones, palmtop computers, Personal Digital Assistants (PDAs) and automobile installed personal computers (Auto PCs) are becoming very popular. For example, one million Palm Pilots from US Robotics were sold in its first year. Orthogonal to the growth in popularity of handheld computers, Internet and networking applications have been growing at a rapid pace. The number of users who now want to remain connected even when they are mobile is growing. This, coupled with the rapid advances in wireless communication, has made it possible to browse the World Wide Web (WWW or the Web) in the Internet, check e-mail, transfer files, get information like stock quotes, flight arrival/departure information, and even do business transactions using a handheld device like a PDA.

However, the performance of current mobile applications is usually not acceptable. Traditional computing and networking paradigms do not give good performance on handheld devices communicating over a weakly connected link, e.g., a wireless link. Typical handheld devices do not have hard disks. Handheld devices typically use flash memory or battery backed Random Access Memory (RAM) to provide nonvolatile storage. Thus, traditional file systems and data access methods do not work well on handheld devices. Similarly, traditional network communication protocols like TCP/IP (Transfer Control Protocol/Internet Protocol) do not perform well on weakly connected links such as the links typifying handheld devices. It has been noted that TCP responds to all losses by invoking congestion control and avoidance algorithms, and that this results in degraded end-to-end performance in wireless and lossy systems. In addition, due to severe memory restrictions, not all handheld devices can implement the TCP/IP stack and satisfy runtime memory requirements. It is also important to realize, given the limited amount of memory and computing resources on handheld devices, that there is a need to provide a wide variety of services by having a simple integrated software structure and by eliminating functional duplication. See J. Kay and J. Pasquale, "The Importance of Non-Data Touching Processing Overheads in TCP/IP", *Proceedings of SIGCOMM '93*, ACM, 1993.

There is considerable amount of work in providing a replicated, weakly consistent storage mechanism for mobile computing environments. The Coda project, described by J. J. Kistler and M. Satyanarayanan in "Disconnected Operation in the Coda File System", *ACM Transactions on Computer Systems*, 10:3–25, 1992, uses optimistic concurrency control and prefetching for supporting mobile computing. It logs all updates during disconnected mode and replays the log on reconnection. Later versions of Coda introduce certain adaptive mechanisms to support low bandwidth networks and intermittent communication.

The Bayou project, described by Douglas B. Terry, Marvin M. Theimer, Karin Peterson, Alan J. Demers, Mike J. Spreitzer and Carl H. Hauser in "Managing Update Conflicts in Bayou, A Weakly Connected Replicated Storage System", *Proceedings of the Fifteenth ACM Symposium on Operating Systems Principles,* 1995, defines an architecture for sharing data among mobile users and provides methods for detection and resolution of conflicts. It implements a mechanism for enabling client application to continue even if a conflict remains.

The Rover toolkit, described by Anthony D. Joseph, Alan F. deLespinasse, Joshua A. Tauber, David K. Gifford and M. Frans Kaashoek in "Rover: A Toolkit for Mobile Information Access", *Proceedings of the Fifteenth ACM Symposium on Operating Systems Principles,* 1995, provides mobile communication support on the basis of relocatable dynamic objects and queued remote procedure calls. Rover allows client operation and invocation of non-blocking remote procedure calls even when a host is disconnected.

The Cadmium project, described by Aline Baggio in "Design and Early Implementation of the Cadmium Mobile and Disconnectable Middleware Support", *INRIA Research Report* 3515, October 1998, uses a mechanism for referencing remote objects, a support station model, a mechanism for binding to objects and a dynamic replication, caching, and prefetching scheme to provide system level support for disconnected and mobile usage. It assumes the use of powerful laptop computers as the mobile clients.

The BNU project, described by T. Watson and B. Bershad in "Local Area Mobile Computing on Stock Hardware and Mostly Stock Software", *Proceedings of USENIX Symposium on Mobile and Location-Independent Computing*, Cambridge, Mass., 1993, is also an RPC-driven application framework that includes proxies on stationary hosts for hiding the mobility of the system. Later versions of the project also includes support for disconnected operation like the queued RPC model.

The InfoPad project described by My T. Le, Fred Burghardt, Srinivasan Seshan and Jan Rabaey in "InfoNet: The Networking Infrastructure of InfoPad", *Proceedings of Compcon,* 1995, also has the proxy approach where the mobile device is dumb and the entire processing is offloaded to the server. They assume a permanent connection and there is no notion of disconnected operation on the client.

Xerox's PARCTAB system, described by R. Want, B. N. Schilit, N. I. Adams, R. Gold, K. Peterson, D. Goldberg, J. R. Ellis and M. Weiser in "An Overview of the PARCTAB Ubiquitous Computing Experiment", *Personal Communications,* Vol. 2, No. 6, IEEE, 1995, also assumes a permanent connection and all services are off-loaded to the server by using the system's "Tab Agent" mechanism.

WebExpress, described by Barron C. Housel and David B. Lindquist in "WebExpress: A System for Optimizing Web Browsing in a Wireless Environment", *Proceedings of the ACM/IEEE MOBICOM '96 Conference,* 1996, implements an HTML (HyperText Markup Language) cache and uses the concept of differencing as an original transfer mechanism to reduce network traffic and latency. In addition, they do HTTP (HyperText Transfer Protocol) reductions for connection overheads and verbose protocol inefficiencies.

However, most of this work in mobile computing and information access relates to operating system principles and adding weak consistency models along with caching, prefetching, etc., and with enabling remote procedure calls. The applicants' invention may be seen as a layer beneath these principles and can be used effectively for improving the performance of the above systems. The protocol described herein will improve the effective data transfer rate. It has been sufficiently demonstrated in literature that TCP and other wired network protocols do not perform well for wireless networks. Some work has been done to solve this problem by proposing modifications to TCP.

Hari Balakrishnan, Venkata N. Padmanabhan, Srinivasan Seshan and Randy H. Katz, in "A Comparison of Mechanisms for Improving TCP Performance over Wireless Links", *IEEE/ACM Transactions on Networking,* December 1997, have a good comparison of several schemes designed to improve the performance of TCP in wireless networks. They classify these schemes into three broad categories: (1) end-to-end protocols, where loss recovery is performed by the sender; (2) link-layer protocols, that provide local reliability; and (3) split-connection protocols, that break the end-to-end connection into two parts at the base station.

Ajay Bakre and B. R. Badrinath in "I-TCP: Indirect TCP for Mobile Hosts", *Proceedings of the 15$^{th}$ International Conference on Distributed Computing Systems,* May 1995, split a TCP connection so that the uplink and downlink connections can be optimized separately, and congestion control and retransmissions on the wireless link can be isolated from those on the wireline link. But this comes at the price of breaking end-to-end TCP semantics and inducing extra copying overhead.

Hari Balakrishnan, Srinivasan Seshan and Randy Katz, in "Improving Reliable Transport and Handoff Performance in Cellular Wireless Networks", *ACM Wireless Networks,* 1(4), December 1995, propose a link-layer protocol that introduces a module, called the snoop agent, at the base station which monitors every packet that passes through the TCP connection in both directions and maintains a cache of TCP segments sent across the link that have not yet been acknowledged by the receiver. There are more such proposed modifications to TCP, but a small handheld device may not be able to implement the modified TCP protocol because it may even be larger. In addition, dynamic RAM is restricted on such devices and the buffer area for the TCP stack may become a major concern along with wasted processing power during the copying of data.

Furthermore, there has been a lot of work related to avoiding end-to-end congestion control and re-transmissions at the lower layers in the OSI (Open Systems Interconnection) layer model, e.g., designing a Medium Access Control (MAC) for Wireless Local Area Networks (LANs). See K. C. Chen, "Medium Access Control of Wireless LANs for Mobile Computing", *IEEE Network,* September/October 1994. But, these techniques may be seen as orthogonal to the data transfer mechanism being proposed herein. The disclosed protocol will only gain from techniques that improve the raw transfer rate over wireless networks.

A group of companies has come together to propose a "Wireless Application Protocol" (WAP). See Wireless Application Protocol Form, http://www.wapforum.org. The WAP is fast becoming the de-facto world standard for wireless information and telephony services on digital mobile phones and other wireless terminals. WAP filters HTML documents into their WML to utilize binary transmission for greater compression during web browsing where a lot of text is transmitted.

Lazaridis et al., in U.S. Pat. No. 5,802,312, present a "System for Transmitting Data Files Between Computers in a Wireless Environment Utilizing a File Transfer Agent Executing on Host System". The inventions disclosed by Lazaridis et a. have similar goals, but they do not propose a communication protocol. In addition to recommending a communications protocol, the applicants seek to avoid all unnecessary data duplication. Similarly, Eggleston et al. in U.S. Pat. No. 5,771,353 propose a "System Having Virtual Session Manager Used Sessionless-Oriented Protocol to Communicate with User Device via Wireless Channel and Session-Oriented Protocol to Communicate with Host Server".

SUMMARY OF THE INVENTION

It is therefore an object of the present invention to provide a data transfer mechanism for handheld devices with small memory size and restricted processor speeds.

It is another object of the invention to provide a solution to the problem of re-transmissions in case of frequent network disconnections and thus save expensive bandwidth.

It is a further object of the invention to provide a data transfer mechanism for handheld devices that reduces battery power consumption.

According to the invention, there is provided a communication mechanism with an integrated software structure for handheld devices communicating over a wireless link. The communication mechanism is particularly well suited for mobile clients connected to a server over weakly connected links as it handles broken links and re-connections very well. An application on the mobile client connects to a peer application on the server through a Gateway on the server. Thus, the server applications themselves do not need to handle different standards and protocols for different clients, e.g., a WindowsCE client or a Smart-Phone client.

The system eliminates functional duplication which makes the footprint of this system small. Hence, it is well suited for handheld devices where memory is at a premium. The system is optimized to perform minimal computing and avoid unnecessary buffering and duplication of data. It is, thus, suited for handheld devices where computing power is constrained since they typically are built around slower microprocessors than desktops. The system recognizes the non-availability of a hard disk on a handheld device and ensures that buffering is not done for data access since data can now be modified "in place" for systems built around RAM, EEPROM, FLASH, and other similar technologies used in handheld devices.

The system allows the application to start using a data file even before receiving the entire file by using a "Validity Table" that has information about the valid, i.e., usable, portions of a file. The system also allows the application to send only the modified portions of a file to the other side. This saves precious bandwidth since the entire file does not have to be re-transmitted. The system, further, helps in power conservation since it avoids unnecessary duplication of data. This is done by reducing the path length of the program and avoiding unnecessary data copying loops. Reduction in power consumption helps in increasing the battery life of the handheld device. The system provides two-way data transfer useful for file transfers, mail, Web browsing, personal information management.

BRIEF DESCRIPTION OF THE DRAWINGS

The foregoing and other objects, aspects and advantages will be better understood from the following detailed description of a preferred embodiment of the invention with reference to the drawings, in which:

FIGS. 3A and 3B are data flow diagrams showing, respectively, a client request for a new session and client reconnection;

FIG. 4 is a block diagram of the server architecture where there is a separate virtual datapool for each client connected to the server;

FIG. 5A illustrates the structure of a BlockInfo node in the virtual datapool, and FIG. 5B illustrates an example of a virtual datapool that includes a 35 KB file;

DETAILED DESCRIPTION OF A PREFERRED EMBODIMENT OF THE INVENTION

Figure 1:
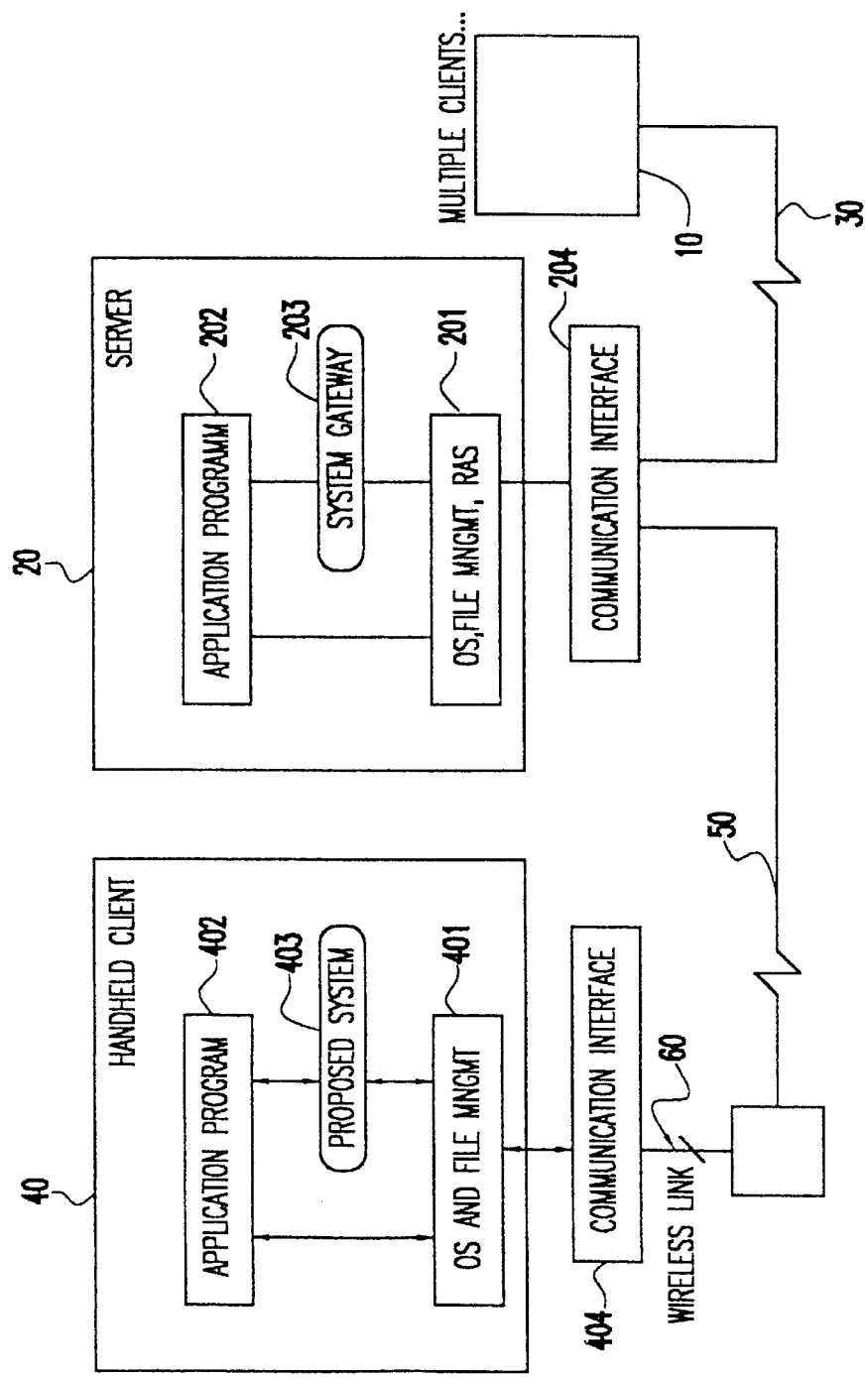
FIG. 1 is a block diagram showing the system according to the invention in a client-server environment.

Referring now to the drawings, and more particularly to FIG. 1, there is shown a block diagram of the system in a client-server environment. Multiple clients 10 connect to a server 20 using a weakly connected link 30. The clients 10 may also use any other underlying communication media to connect to the server 20. Furthermore, a handheld client 40 may use a different network media 50 for connecting to the server 20. For example, a wired link may be used, though the present invention will provide substantial benefits only on a weakly connected link such as a wireless link 60.

Each handheld client 40 typically includes an Operating System (OS) and File Management program 401 on which a client Application Program 402 runs. The integrated software system 403 according to the invention provides an interface between the Application Program 402 and the OS and File Management program 401. A communication interface 404, either internal or external as shown in FIG. 1, provides the interface between the handheld client 40 and the wireless link 60.

The server 20 also includes an OS and File Management program 201 on which a peer Application Program 202 runs. The Application Program 402 running on the handheld client 40 connects to the Application Program 202 running on the server 20 through the System Gateway 203. A communication interface 204, either internal or external as shown in FIG. 1, provides the interface between the server 20 and the communication media 50.

Figure 2B:
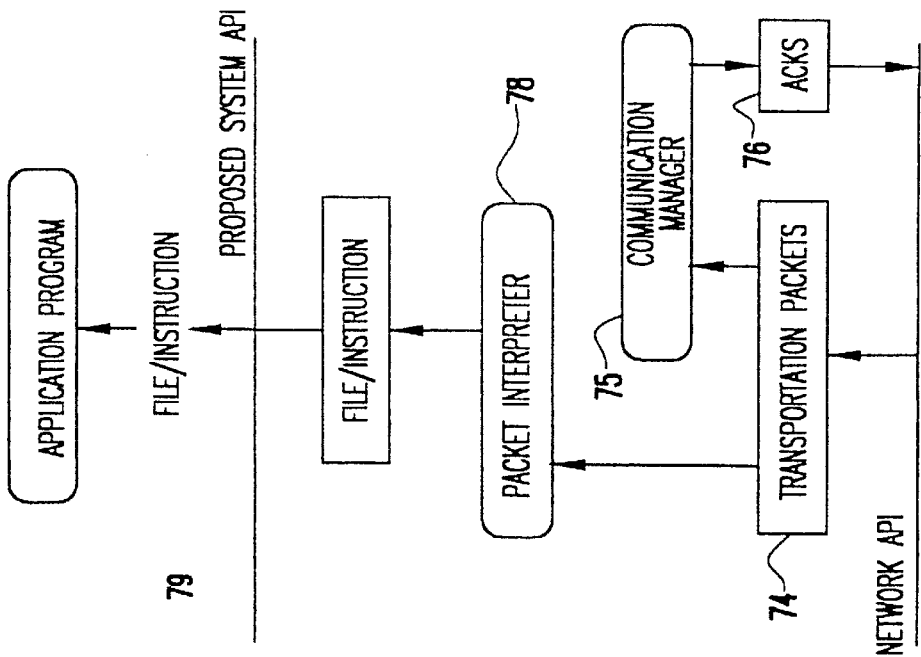
FIGS. 2A and 2B are block diagrams of the system architecture showing, respectively, the sender side and receiver side.
Figure 2A:
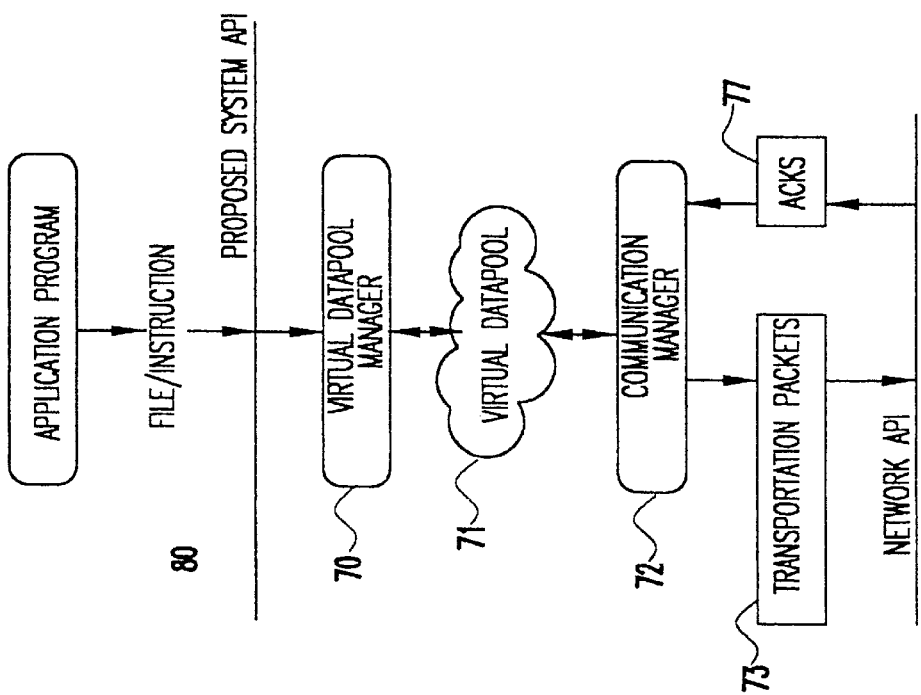

As shown in FIGS. 2A and 2B, the integrated software system 403 according to the invention runs as a middle-ware on the client side, as does the system gateway 203 on the server side. The system builds upon the basic networking capabilities provided by an Operating System (OS) to provide a robust and efficient communication mechanism. Both the client system 403 as well as the server gateway 203 are composed of the sender and receiver side illustrated in FIGS. 2A and 2B, respectively. Thus, there can be two-way communication. The functionality of the sender side and the receiver side may, however, be merged depending upon implementation.

With reference first to FIG. 2A showing in more detail the sender side. Whenever an application needs to send a file to the other side, it passes the file name to the client system 403 or the gateway server 203, depending upon whether the application is running on a client or a server, through an Application Program Interface (API) call. The "Virtual Datapool Manager" 70 then proceeds to break the file into "virtual data packets" and adds these to a "virtual datapool" 71. The datapool 71 is nothing but a set of such virtual packets that need to be sent to the receiver side. When a network link is established, a communication manager 72 selects a packet from the virtual datapool 71 and sends it to the receiver side through a register containing transportation packets 73 over the physical layer of the communication link using the network API.

The system 403 distinguishes packets into two kinds; data and instruction. Data packets are used to transfer data and are usually formed by chopping a file into fixed sized blocks. Instruction packets are used to send commands to the other side and are typically used by an application to provide Remote Procedure Calls (RPC).

Referring next to FIG. 2B, the receiver side has a complementary architecture. Transportation packets transmitted over the network are received via the network API in register 74. Upon detecting the receipt of a transportation packet in the register 74, a receiver communication manager 75 generates an acknowledgment containing the sender's address which is input to an acknowledgment register 76 and transmitted to the sender via the network. This acknowledgment is received by the sender in acknowledgment register 77 which communicates the receipt of an acknowledgment to the sender communication manager 72 (FIG. 2A). The sender communication manager 72 removes a virtual packet from the virtual datapool 71 when the communication manager 72 receives an acknowledgment for that packet. The received transportation packets in register 74 are interpreted in packet interpreter function 78 and appropriately routed, depending on whether the packet is a data packet or an instruction packet, to the application via the system call API.

Session management is as shown in FIGS. 3A and 3B. Communication between client 40 and server 20 is initiated by the client 40, e.g., when the client 40 makes a phone call and this establishes a network connection 60 between the two. If the client 40 is beginning a new session, then the client 40 sends a request 82 for starting a new session as shown in FIG. 3A. The server 20 then responds by allotting a new session-id 84 and sending it to the client 40 which identifies their current session. However, for weakly connected links it is possible that the connection 60 is broken and the client 40 is trying to re-establish the session. In such a case, as shown in FIG. 3B, the client 40 sends the session-id 86 of the session which was in progression before the connection 60 was broken. In this case, the server 20 verifies if the client 40 has sent the correct session-id 86 and sends a VERIFIED acknowledgment 88 to the client 40. The server 20 does the verification by matching the session-id that it stored for this particular client 40 during the previous session. The server 20 identifies each client 40 by its client-id which can just be its IP address. The server 20 may also send an EXPIRED acknowledgment 89 if the client 40 reconnected after a timeout (explained later) or for other security reasons. The client 40 must then start a new session and go through another authentication process as specified by the peer application processes. Thus, this protocol provides a simple and basic session mechanism.

The data transfer begins after the handshake is completed. The server creates a virtual datapool for the session in progress. This virtual datapool is created for each session, i.e., for each client 40 which is connected to the server 20, as shown in FIG. 4. In FIG. 4, each datapool on the server is uniquely identified by the session-id 84 given by the server when the client requested a new session. The datapool 71 is identified by the session-id 84 returned by the server 20 when client 40 sent the request 82 for a new session. The virtual datapool can be null initially, or the application program 80 on the sender side may choose to initialize it with some default files when the session starts. In either case, the client 40 can send instructions requesting data to the client's peer server process. The server 20 then processes these instructions and adds files (i.e. data) to the virtual datapool. The server 20 may also send instructions to the client 40 for authentication, data request etc. The server 20 can either choose what file to send to the client 40 or the client 40 may request the server 20 for some particular file by sending an instruction to the server 20.

The virtual datapool 71 is maintained on the sender side until all the information, i.e., data or instructions, has been successfully received by the receiver. However, there can be cases when there is a temporary disconnection (since it is a weakly connected link 30) or there may in fact be a permanent link failure such as when one of the sides decides to finish the session abruptly. In such cases the virtual datapool 71 is removed from the sender memory and the session-id 84 is freed so that it can be used by another of the multiple clients 10. The system associates a time-to-live (TTL) parameter with each virtual datapool. This TTL for each virtual datapool may be a constant parameter which is proportional to the number of communication packets in the virtual datapool at the start of communication. The constant of proportionality should be chosen such that the sender is confident that if the data has not been transferred to the receiver within that TTL then either the receiver is not interested in the session or the link 50 has ben disconnected, i.e., it is not in a temporary freeze state.

In an alternative embodiment, the TTL may be a dynamic parameter which depends on the behavior of the connecting link 50 and the number of packets remaining in the virtual datapool. Thus, the TTL increases when the link is slow and decreases when the link increases in speed. The link speed can be determined by the speed through which the acknowledgments are being received. The TTL also increases/decreases when new blocks, i.e. data or instruction, are added/deleted to/from the virtual datapool since the number of packets inside the virtual datapool increases/decreases.

When the application program needs to transfer files to the other side, it will call a system's API function with the name of the files to be transmitted. The proposed protocol, like most other communication protocols, transmits the files after chopping them into fixed size blocks or packets. Without loss of generality, the preferred embodiment of this invention uses a block size of 4 KB. When an application requests for a file transfer, the system logically chops the file into blocks. This chopping is logical since there is no copying (duplication) of data into any fixed size blocks. This is possible since files always reside in memory (RAM/FLASH) as opposed to hard disks in desktop computers. The system achieves this chopping by just creating as many data structures for as many blocks as the file would be composed of. This data structure, called BlockInfo in the preferred embodiment, only maintains information about the block but does not contain the actual data, as shown in FIGS. 5A and 5B. A BlockInfo node 100 containing five fields is maintained for each block in the virtual datapool.

Referring first to FIG. 5A, the first field in each BlockInfo node 100 is a state field 101. The state field 101 is a 1-bit field which describes the state of the corresponding block. The possible values for the state field 101 are TRANS and WAITACK, as shown in FIG. 5B. The significance of the WAITACK value for the state field 101 will be discussed later. The communication and use of the state field 101 are described below. The state field 101 is initialized to the TRANS state for all the blocks of a new file at the time of its inclusion in the virtual datapool.

A BlockInfo node 100 stores only a pointer to the actual data and does not copy the entire data. Thus, the second field in each BlockInfo node 100 is a PtrToData field 102. The PtrToData field 102 stores the pointer to the actual data. This field is used to chop the data file into virtual blocks. FIG. 5B illustrates the use of the PtrToData field 102 by showing the pointer 103 for the first block 103A, the pointer 104 for the second block 104A, and the pointer 105 for the final block 105A of a 35 KB file 106. BlockInfo node 107 is shown in FIG. 5B with the values of the various fields blank to represent the other blocks in the file that are not shown. The pointers for the other blocks in this file or any other file are consistent with the pattern demonstrated by pointers 103, 104, and 105.

In a BlockInfo node 100 for a block from an instruction file, the PtrToData field 102 points to the location in memory where the fixed size instruction is stored. Note that even though the system API function call is used to create this instruction in memory, the system by itself does not prescribe any format or structure for the instruction.

The next field in each BlockInfo node 100 is a type field 108. The type field is a 1-bit field that describes whether this particular data structure is for data or for instruction. In FIG. 5B, the file is a data file. Thus, type fields 109–111 for BlockInfo nodes 112–114 each contain an indication to that effect. In the preferred embodiment, the type field 108 holds a "0" to indicate that the data structure is for data and a "1" to indicate that the data structure holds an instruction.

After the type field 103, each BlockInfo node 100 has a FileID field 104. The FileID field 115 is only used in the BlockInfo node 100 of a data block and not in an instruction block. The FileID field 104 identifies the file to which the block belongs. For example, in FIG. 5B the FileID 116 of the file 106 is "1ab9e0". Thus, the FileID fields 117–119 of BlockInfo nodes 112–114 contain that information.

The last field in each BlockInfo node 100 is an offset field 120. Like the FileID field 104, the offset field 105 is only used in the BlockInfo node 100 of a data block, and not in an instruction block. The offset field 105 gives the offset distance of the block from the origin of the file in multiples of the block size (4 KB in the preferred embodiment). Thus, the offset field 121 in the BlockInfo node 112 for the first block 103A of file 106 contains a "0", the offset field 122 in the BlockInfo node 113 for the second block 104A of file 106 contains a "1", and the offset field 123 in the BlockInfo node 114 for the final block 105A in the file 106 contains an "8", the size of the file 106 in increments of the size of the block.

In addition, the system provides an API for an application to specify the portions of the file that have been modified. The virtual datapool manager 70 then adds only those blocks to the virtual datapool 71 in which there has been a modification. Thus, the entire file will not be transmitted. Instead only the modified portions (in the granularity of system's block size) will be transmitted saving both bandwidth and processing power. Now, the actual transmission of instructions and data will be described.

Figure 6:
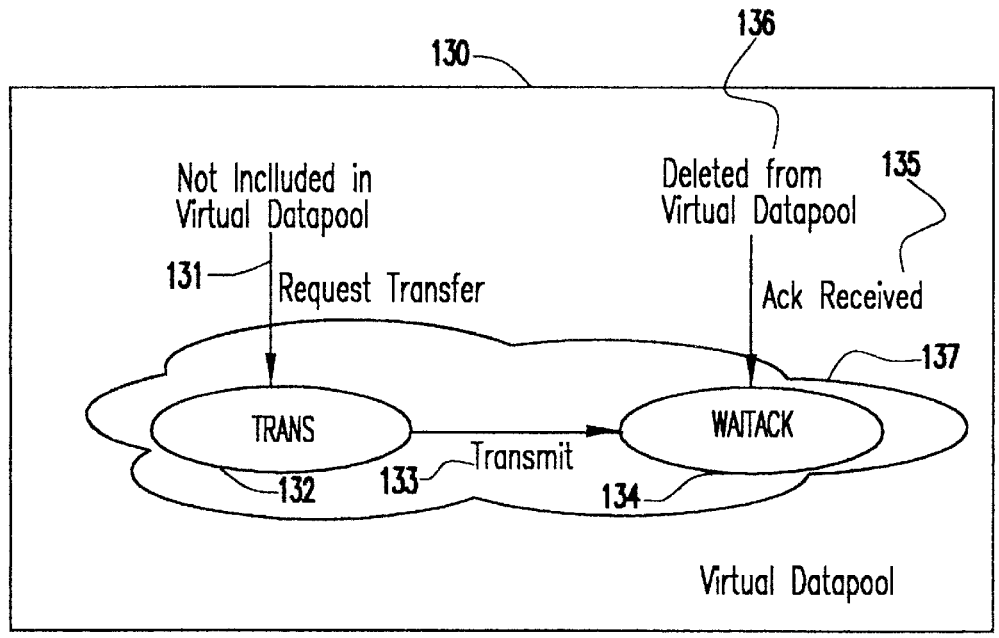
FIG. 6 is a block diagram of a finite state machine for the state field of a BlockInfo node.

Whenever the virtual datapool is non-null, it implies that data has to be sent to the other side. The transmission of the data packets is primarily controlled by the state field 101 of each BlockInfo node 100, which is a Finite State Machine (FSM) 130, as shown in FIG. 6. When an application requests the system for a file transfer 131, the state fields of all BlockInfo nodes for this file are initialized to TRANS 132. The system then selects a BlockInfo node in the TRANS state 132, generates a transportation packet using the information in the BlockInfo control structure, and writes the packet on the network as indicated by the transmit function 133. After transmitting in this manner, the system changes the value of the state field to WAITACK 134. When an acknowledgment for the packet is received 135, it means that the corresponding block was successfully transferred to the other side, and the BlockInfo node is removed or deleted from the virtual datapool 136. Note that the system needs to distinguish between only two states, TRANS and WAITACK for a block in the virtual datapool 137. Hence, only a single bit is required for the state field of a BlockInfo node present in the virtual datapool 137.

If there is no BlockInfo node in the TRANS state 132, and the transfer set is non-null, it means that all blocks have been transmitted, but the acknowledgment for a transmitted packet has not been received for at least one packet. Such a block will be in the WAITACK state 134. The system assumes that the packet was lost and proceeds to retransmit such a block by generating the transportation packet again. This retransmission is performed whenever there is no block in the TRANS state 132 but at least one block is in the WAITACK state 134. However, in an alternative embodiment a timeout mechanism may be used wherein the system sits idle and does nothing if there is no block in the TRANS state 132, and will retransmit only after there is a timeout for the block in the WAITACK state 134. This technique will be useful when it is known that the acknowledgments arrive slowly.

There is yet another method of choosing a packet to transmit. If an acknowledgment for some particular packet is received, and, at the same time, another packet was transmitted before the acknowledged packet but an acknowledgment has not been received for the earlier transmitted packet, then it can be assumed that the earlier transmitted packet was lost. When these circumstances occur, the earlier transmitted packet is retransmitted. This technique will improve performance by filling any holes in a transmitted file sooner. This technique is also an effective method for quick sequencing of the packets. However, this method must be disabled when it is known that packets and acknowledgments can come significantly out-of-order.

Thus, there are many different heuristics for ordering the transmission of virtual packets from one side to the other. Subject to the underlying network characteristics and permissible implementation complexity, nearly any heuristic may be selected to govern the ordering of the transmission of virtual packets.

Figure 7:
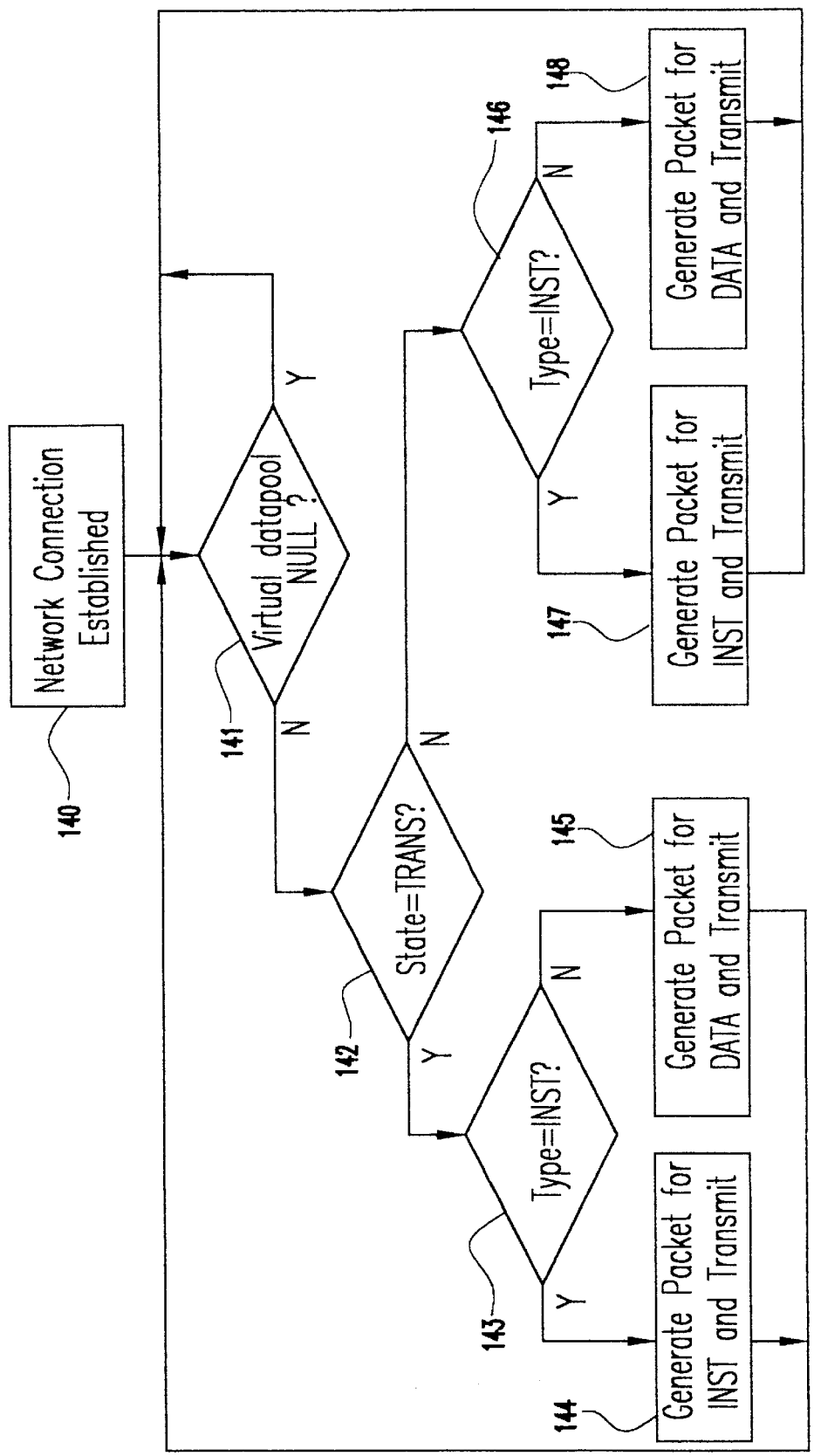
FIG. 7 is a flow diagram illustrating the logic for determining the transmission priority of blocks inside a virtual datapool.

An example of one such methodology for determining which block to transmit is shown as a flowchart in FIG. 7. When a network connection is established 140, the first step is to determine whether or not the datapool is in a null state 141. If the datapool is in a null state, then a new transmission may commence and the logic loop depicted ends without advancing to any of the subsequent steps. If the datapool is not in a null state, it indicates that there are blocks, either data or instruction, to be transmitted. This could be either due to the blocks remaining from an earlier transmission that is being reconnected or new blocks to be sent to the other side since the application would typically add blocks to the datapool and then call the connect routine to start transmission.

The contents of the state field provide an indication of where the block stands in the process of transmission. If the datapool is non-null, it could contain two kinds of blocks, those that have been transmitted at least once and are now in the WAITACK state and those that have not been transmitted even once and which are in the TRANS state. The preferred embodiment chooses to send those blocks first that have not been transmitted even once since they definitely have to be sent while there may not be a need to re-transmit a block in the WAITACK state if an acknowledgment is received for it. Decision block 142 evaluates the state field 142 and determines if there is any block in the TRANS state. If there is some block in the TRANS state, the process further performs an evaluation 143 to determine if the block is an instruction block or a data block. If the block is an instruction block, then an instruction packet is generated and transmitted 144 for that block. Afterwards, the virtual datapool is reevaluated 141. If the virtual datapool is now null, then that indicates that no blocks remain in the virtual datapool. Likewise, if the block is a data block, then a data packet is generated and transmitted 145 for that block, and afterwards, the virtual datapool is reevaluated 141.

If it is determined from the evaluation of the state field 142 that there is no block in the TRANS state, it implies that all blocks have been transmitted at least once. The process now starts re-transmitting the blocks for which an acknowledgment has not bee received. Here, the process may wait for a timeout to occur for the block and not start re-transmitting immediately. Consequently, an evaluation is performed at decision block 146 to determine if the block in the WAITACK state is an instruction block or a data block. If the block is an instruction block, then an instruction packet is generated and transmitted 147 for that block. Afterwards, the virtual datapool is reevaluated 141. If the virtual datapool is now null, then that indicates that the no blocks remain in the virtual datapool. Likewise, if the block is a data block, then a data packet is generated and transmitted 148 for that block, and afterwards, the virtual datapool is reevaluated 141.

A methodology of sending all blocks, even blocks that have not previously been sent, before re-transmitting any packets ensures that there is no unnecessary retransmission in case of slow acknowledgment receipt. In addition, the system transmits instruction blocks before data blocks, as shown by decision blocks 143 and 146, since instructions may be used to perform important and urgent task. For example, the deletion of certain files to create space on the other side is an instruction task that should be performed before data blocks are transmitted. Similarly, a change in the list of files being requested might obviate the need to transmit data blocks in the virtual datapool. Thus, this is another instruction task that should be performed before data blocks are transmitted to avoid wasteful transactions. For this reason, instruction blocks are transmitted before data blocks are transmitted. In an alternative embodiment, the computer system may give higher priority to even those instruction blocks which are in the WAITACK state over those data blocks which are in TRANS state. Thus, the decision block 142 in FIG. 7 checks for "TYPE=INST?" and the decision blocks 143 and 146 check for "STATE= TRANS?". Such an implementation may in addition include a timeout mechanism for retransmission of the instruction blocks in WAITACK state.

Figure 8A:
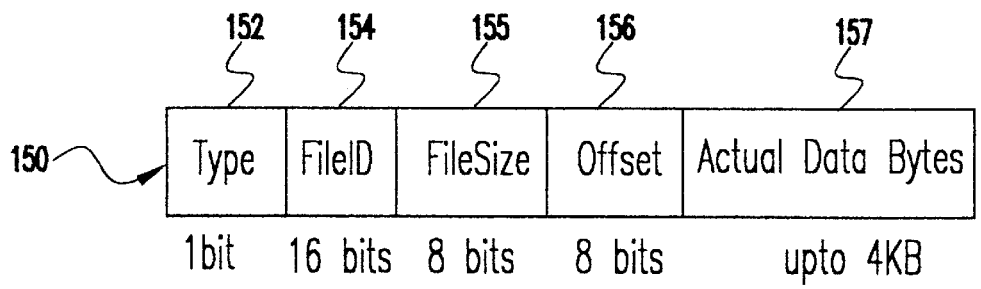
FIGS. 8A and 8B are block diagrams showing the header information in a transportation packet for, respectively, data and an instruction.
Figure 8B:
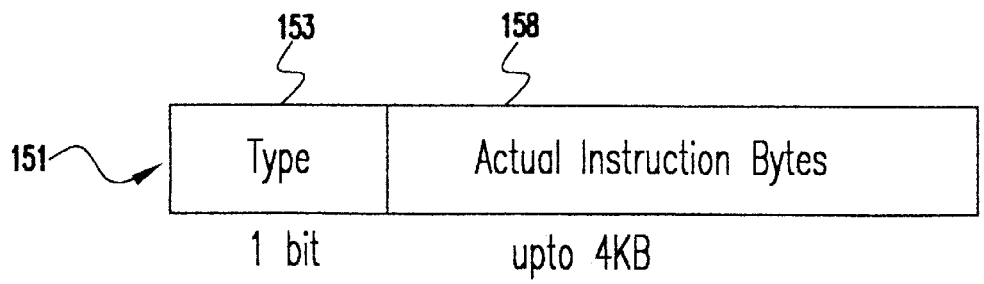

Now, with reference to FIGS. 8A and 8B, the generation by the system of the transportation packet to be given to the network layer API will be discussed. FIG. 8A shows the fields contained in a transportation packet for data 150. FIG. 8B shows the fields contained in a transportation packet for instructions 151. If the transportation packet is for data 150, then type field 152 contains an indication that the transportation packet is for data. If the transportation packet is for instructions 151, then type field 153 contains an indication to that effect. These type fields 152, 153 are easily generated by copying the Type field 103 from the BlockInfo node 100.

Data transportation packets 150 contain a FileID field 154. As was the case with BlockInfo node 100 for an instruction block, instruction transportation packets 151 do not have a FileID field. The FileID field 154 contains the file-id of the file of which the data transportation packet 150 is a part. Thus, the information contained in the FileID field 154 will be identical to the information contained in the FileID field 104 of a BlockInfo node 100 as described above in association with FIG. 5A. Therefore, the FileID field 154 is again easily generated by copying the FileID field 104 from the BlockInfo node 100 for a data block. The FileID field 154 has a length of 16 bits in the preferred embodiment. This length restricts the number of transferable files for a single client 10 to 65,536. It is believed that this limitation is reasonable for a handheld device.

Data transportation packets 150 also contain a FileSize field 155. The FileSize field 155 of a data transportation packet 150 gives the size of the file in units of the fixed block size, 4 KB in the preferred embodiment. The contents of the FileSize field 155 can be generated by searching a lookup table using the contents of the file-id field 154, or by using an OS API call. The function of the FileSize field 155 is described in detail later. As with the FileID field 154, the FileSize field 155 exists only in transportation packets for data 150, not transportation packets for instructions 151. The width of the FileSize field 155 is determined by the maximum file size. The system can prescribe a limit based on OS considerations. In the preferred embodiment, the FileSize field 155 is an 8-bit field. This corresponds to a maximum file size of 256 times 4 KB or 1 MB. Again, 1 MB is believed to be a reasonable restriction on file size for a handheld device.

Data transportation packets 150 also contain an offset field 156. The offset field 156 indicates the offset distance of the block that the packet corresponds with from the beginning of the file in units of the fixed block size, 4 KB in the preferred embodiment. The offset field 156 exists only for data transportation packets 150, not for instruction transportation packets 151. Like the Type field 152 and the FileID 154, the offset field 156 may be easily generated by copying the Offset field 105 of the BlockInfo node 100. The offset field 156 is an 8-bit field in the preferred embodiment since the maximum size of a file is taken to be 1 MB and each block is 4 KB in size.

Next, the substantive data is copied into a data field 157. The substantive data is copied by following the PtrToData field 102 in the BlockInfo node 100 of the corresponding data block. The data field 157 is variable in size, and the maximum size of the data field 157 would be the fixed block size, 4 KB in the preferred embodiment.

Thus, the overhead memory requirement for attaching the various fields in a data transportation packet 150 for the preferred embodiment is 1+16+8+8=33 bits. This represents approximately 0.1% of the actual data in the 35 KB file of the given example.

If the transportation packet is an instruction packet 151, the final step is to copy the substantive instruction into an instruction field 158. Like the data field 157, the instruction field 158 is also variable in size up to the limit of the fixed block size.

Note that the data packet 150 and instruction packet 151 header structure shown in FIGS. 8A and 8B are merely one single embodiment of the structure used in the preferred embodiments of each respective packet. These embodiments are described for the purpose of illustrating a preferred embodiment of the present invention. However, the packet header structure described herein may be modified during implementation for byte alignment and various optimizations.

Until now, this written description of the present invention has focused on how the system handles transmission of data on the side sending the transmission. The methodology on the side of the system receiving the transmission will now be described. When the receiving side of the system receives a packet from the network, it first generates an acknowledgment for the packet and transmits this acknowledgment of the packet. In an alternative embodiment, the system may also choose to piggyback the acknowledgment on another packet. The type field in the header information of the packet is then decoded to determine if it is a data packet 150 or an instruction packet 151. If the packet is an instruction packet 151, then the contents of the instruction field 158 are stripped from the headers for the instruction packet 151 and given to the application program.

The system may do this through a polling mechanism whereby it saves the contents of the instruction field 158 and the application program polls some appropriate status bits by using API function calls at regular intervals to see if some particular instruction has arrived. Alternatively, the system may use an interrupt mechanism to inform the application program of a pending instruction. This choice is dependent upon the method of implementation; however, the choice does not affect the methodology and protocol.

If the packet is a data packet 150, it will contain the fields shown in FIG. 8A and previously introduced. The FileID field 154 is used to determine the file to which the contents of the data field 157 belong. If the data transportation packet 150 is the first to be transmitted containing a particular file-id number in the FileID field 154, then the FileSize field 155 is used to create a new file with the contents of the FileID field 154 as the file-id of the newly created file and the contents of the FileSize field 155 as the size of the newly created file. This new file is created when the first constituent block associated with a file is received as indicated by the presence of a new file id. The offset field 156 is then used to determine the exact location inside the file where the contents of the data field 157 from the data packet 150 will be copied.

The system is built upon an unreliable packet based network. The underlying network could also be a reliable stream based protocol like TCP/IP but it has already been shown that stream based protocols do not work well over lossy communication channels. However, sequencing becomes a problem for a packet based protocol like UDP/IP. It is, thus, necessary to build an acknowledgment mechanism and achieve a sequencing of packets received out-of-order at the receiver side. The acknowledgment mechanism of the present invention has already been described. The system of the present invention avoids an unnecessary duplication and buffering of data packets usually required during the reordering and the sequencing step. The present system obtains this benefit by creating the entire file upon receipt of the first constituent block from a file. By doing so, the contents of the blocks can then be written to the newly created file directly, and no buffering is required. Here, we point out that the system itself does not provide any sequencing control fro the instructions. The length of each instruction is at most the fixed block size, 4 KB in our example, Thus, each instruction arrives in its entirety at the other end. However, different instructions may themselves be received out-of-order. This must be handled by the application, e.g., by adding an instruction counter in the first few bytes of the instruction itself before giving it to the system for transmission to the other end.

Typically, applications or middle-ware built on top of protocols like UDP have an internal buffer which is used for packet sequencing. In such systems, a new file is copied as a valid file only after the entire file 50 has been successfully transferred. In the present invention, a data block can be written to its exact location using the offset field 156 in the data transportation packet 150. Various blocks are copied to their respective locations when they are received without waiting for the remainder of the file to be completely and successfully transferred. This methodology leaves some holes such as invalid data blocks, but these holes are all filled once all the data blocks have been received and acknowledged.

Figures 9A, 9B:
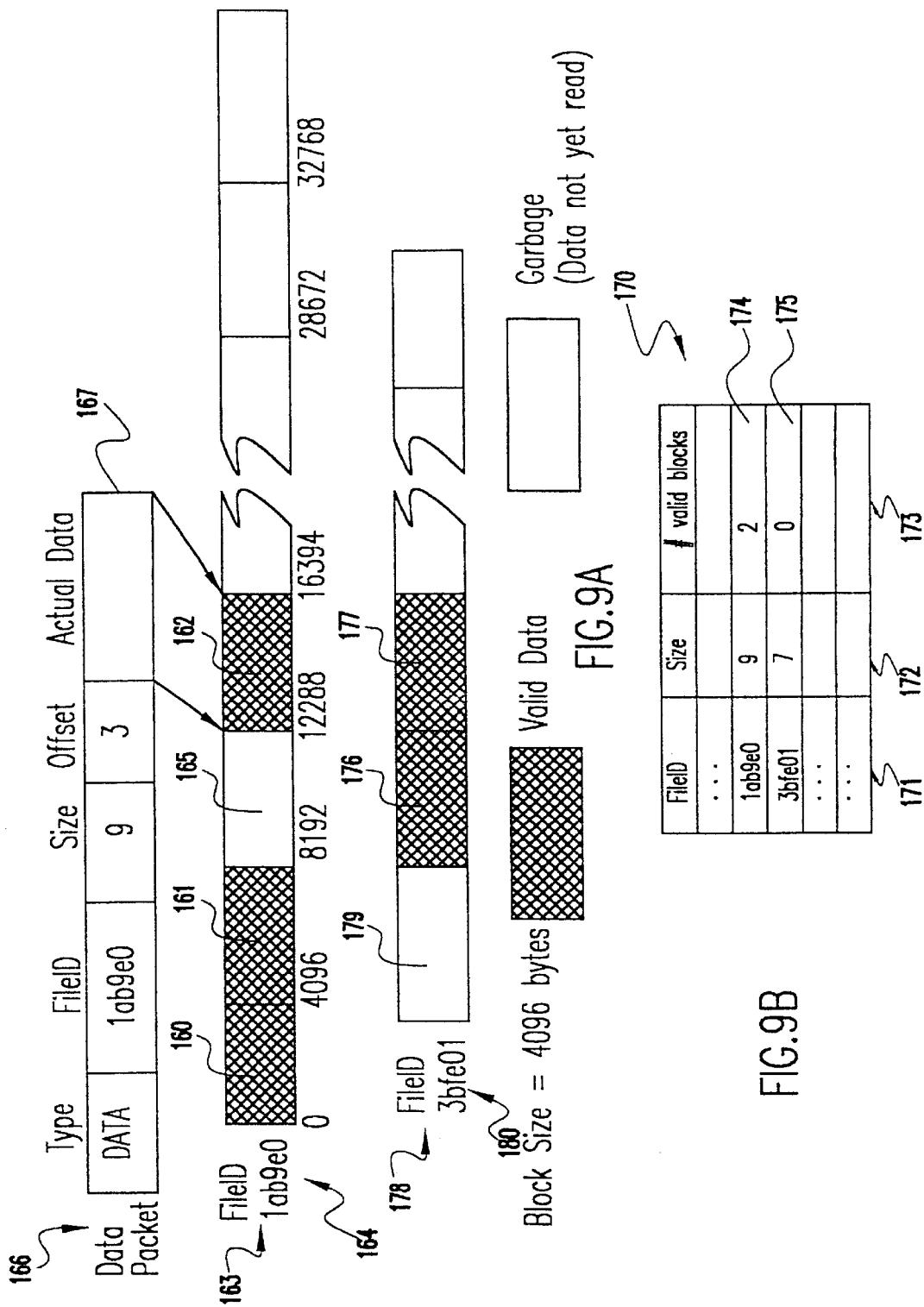
FIG. 9A is a block diagram illustrating the system's technique for avoiding data duplication and buffering on the receiver side.
FIG. 9B is a validity table used for this purpose.

In FIG. 9A, three blocks 160–162 of a file 163 with file-id 1ab9e0 164 have been received as denoted by their shading. The block 165 which starts at location 8192 has not been received. The data packet 166 for block 162 is shown enlarged for illustration. The contents of data field 167 are placed in data block 162.

The system also maintains a validity table 170 as shown in FIG. 9B. The validity table 170 has a column for FileID 171, a column for FileSize 172, and a column for number of valid blocks 173. The primary purpose of the validity table 170 is to keep a record of the number of blocks that have been received from the beginning of each file without any blocks being missing. Thus, in FIG. 9B, the entry in the table 174 for file-id 1ab9e0 is 2 since the block 165 at 8192, the third block in the file 163, has not been received yet. The entry 175 for file-id 3bfe01 is 0 because, even though the second block 176 and third block 177 of that file 178 have been received, the first block 179 has not been received. The validity table 170 allows an application to begin using a file even before the entire file has been received. Thus, in the example of FIG. 9B, an application program cannot start reading file 178 with FileID 3bfe01 180 but it can access the first two blocks 161, 162, a total of 8 KB, of the file 163 with FileID 1ab9e0 164.

This feature can be exploited by applications which can process a file without requiring that the entire file be present. A good example of such an application is a web browser. A web browser does not require the receipt of an entire HTML/XML (hypertext markup language/extended markup language) source file to begin displaying the contents of that file. The present invention enables an application such as a web browser to begin at the point where it stopped when an unstable connection is broken and later reconnected. When dealing with a weakly connected link, this is a big advantage over systems that require an application to start anew when a previously interrupted connection is reestablished.

In an alternative embodiment, the system does not use the FileSize field to create the entire file initially. Instead, when the first constituent block of that file is received, the system creates a preliminary file just big enough to include the first data block received in its proper final location. Thus, assuming a block size of 4 KB if the first block received for some file is at offset 0 then a (0+1)×4=4 KB file is created. If the first block received is at offset 3 then a (3+1)×4=16 KB file is created and the block is written at location 12288 from the start of the file. The first 12 KB of the file created in this second example is invalid. That is, a hole is created.

If the file to which the block belongs already exists when the data packet is received and if the block belongs to one of the holes, then it is simply written in that location. Thus, in the second example above, if a block at offset 1 is received, it is simply written at location 4096. If the block is at an offset larger than any of the previous offsets received for that file then the file size must be increased as necessary to place the most recently received block in its proper final location. This might again create a new hole. Thus, if a block at offset 5 is received in the example above, then the file size must be increased from 16 KB to (5+1)×4=24 KB. The newly received block would be written at location 20480 which creates invalid data from 16384 to 20480. In this alternative embodiment of the present invention, the validity table 170 can still be maintained in the manner described above in association with the preferred embodiment.

File creation on a handheld client 40 differs from file creation on a traditional desktop. Handheld devices like PDAs typically do not contain disks and use nonvolatile memory for persistent storage. Creating a file for a given size is then similar to a malloc ( ) function call and a file append (increasing its size) is similar to a realloc ( ) function call. Thus, in the second methodology described above, if the blocks are received sequentially from the start, as is expected, it will result in a large number of realloc ( ) calls. Most of these calls will be expensive in terms of processor computation and hence, battery power though depending on memory organization and allocation the OS memory manager may do a realloc ( ) in unit time. The only advantage is reduction in length of the packet header since the FileSize field has not been included in each data packet.

Another alternative is to transmit the blocks in reverse order. Then, there will be fewer realloc ( ) calls because the higher offset number will tend to create a larger file in the beginning itself. However, the tradeoff in this further alternative embodiment is that no validity table may be maintained. Furthermore, the application may no longer be able to start accessing the file unless the application can process the file from the end first. In other words, this drawback is highly likely to be present when the blocks of a file are transmitted in reverse order.

Now the invention will be described in the context of mobile information access. As a result of the growing popularity of the Internet, a large number of users now want to browse the web even when they are mobile. A micro web browser can be built on top of the proposed system to send "instructions" for fetching URL sites and receive the files of those sites as "data". Furthermore, the browser can take advantage of the validity table 170 (FIG. 9B) and start displaying the HTML file when the packets are first received. The user, thus, does not have wait for the entire file to be downloaded before seeing it in the browser. An application can be built upon such a system to communicate with a server 20 (FIG. 1) to retrieve information like airline/train schedules, library information etc. This application is, thus, similar to web browsing. It can give an additional capability of fetching user-specific information by sending the user-id to the server 20 as an "instruction". Thus, it can be used to find out the status of a train ticket reservation or get a bank account statement efficiently over a wireless network.

The system can also be used by database management tools for replication of files on the handheld device. The mobile client 40 can choose to copy the database files from the server 20. This user 40 can disconnect the phone, work on the local copy and reconnect to write-back only the modifications. The system described herein is efficient for transferring large amounts of data since the header information overhead is minimal and only the modified portions of the file may selectively be written back. In addition, there is no duplication of data and hence, the system is well suited for saving processor time and thus, battery life during transfer of large databases. Still further, the system disclosed above maintains a context of the database transfer session in its virtual datapool. Thus, on the resumption of the network link after a disconnection, the system of the present invention only needs to transfer unconfirmed blocks and not the entire file.

The system's gateway server 203 can interact with a mail server or read mail files and communicate with the mobile client 40 to allow that handheld client 40 to read e-mail. The client 40 initiates a "get-email" process and the application program sends the username and password as an "instruction" to the peer server program. Thereby, e-mail messages are received as "data". If the server 20 is permitted to call the mobile client 40 then the gateway server 203 can, in addition, page that handheld client 40 by sending a message or by transferring the mail file itself.

While the invention has been described in terms of a single preferred embodiment, those skilled in the art will recognize that the invention can be practiced with modification within the spirit and scope of the appended claims.

What is claimed is:

1. A system for transferring data over a network via a wireless communications link comprising:
   means for establishing a wireless communications link between a sender and a receiver;
   means for breaking an electronic file into a plurality of virtual blocks;
   means for creating a virtual datapool comprised of the plurality of virtual blocks;
   means for determining the priority of at least one of the virtual blocks comprising the virtual datapool;
   means for converting the plurality of virtual blocks into a plurality of transportation packets; and
   means for controlling the transfer of the plurality of transportation packets between the sender and the receiver over the network; further comprising at least one of:
   means for communicating with an application program residing on the sender; or
   means for communicating with an operating system residing on the sender; or
   means for communicating with an application program residing on the receiver; or
   means for communicating with an operating system residing on the receiver.

2. The system as recited in claim 1, wherein the application program transmits files and instruction commands to the system.

3. The system as recited in claim 1, wherein the system transmits files and instruction commands to the application program.

4. A system for transferring data over a network via a wireless communications link comprising:
   means for establishing a wireless communications link between a sender and a receiver;
   means for breaking an electronic file into a plurality of virtual blocks;
   means for creating a virtual datapool comprised of the plurality of virtual blocks;
   means for determining the priority of at least one of the virtual blocks comprising the virtual datapool;
   means for converting the plurality of virtual blocks into a plurality of transportation packets; and
   means for controlling the transfer of the plurality of transportation packets between the sender and the receiver over the network; further comprising means for avoiding data duplication and for buffering on the receiver.

5. The system as recited in claim 4, wherein said means for avoiding data duplication and for buffering comprises a validity table that records a number of consecutive blocks that have been received with respect to a first part of the electronic file.

6. A system for transferring data over a network via a wireless communications link comprising:
   means for establishing a wireless communications link between a sender and a receiver;
   means for breaking an electronic file into a plurality of virtual blocks;
   means for creating a virtual datapool comprised of the plurality of virtual blocks;
   means for determining the priority of at least one of the virtual blocks comprising the virtual datapool;
   means for converting the plurality of virtual blocks into a plurality of transportation packets; and
   means for controlling the transfer of the plurality of transportation packets between the sender and the receiver over the network; wherein each of the plurality of virtual blocks comprises:
   means for indicating a location of each of the plurality of virtual blocks in the electronic file;
   means for indicating whether each of the plurality of virtual blocks is a virtual data block or a virtual instruction block;
   means for identifying the electronic file associated with each virtual block; and
   means for locating each of the plurality of virtual blocks within the electronic file.

7. A system for transferring data over a network via a wireless communications link comprising:
   means for establishing a wireless communications link between a sender and a receiver;
   means for breaking an electronic file into a plurality of virtual blocks;
   means for creating a virtual datapool comprised of the plurality of virtual blocks;
   means for determining the priority of at least one of the virtual blocks comprising the virtual datapool;
   means for converting the plurality of virtual blocks into a plurality of transportation packets; and
   means for controlling the transfer of the plurality of transportation packets between the sender and the receiver over the network; wherein the controlling means indicates which of the plurality of transportation packets are in transit between the sender and the receiver.

8. The system as recited in claim 7, wherein each of the plurality of transportation packets comprise means for indicating whether the transportation packet is a data transportation packet or an instruction transportation packet.

9. The system as recited in claim 8, wherein the instruction transportation packets further comprise an instruction field.

10. The system as recited in claim 7, wherein the data transportation packets further comprise:
means for identifying the electronic file associated with each of the data transportation packets;
means for indicating a size of the electronic file associated with each respective transportation packet;
means for indicating a location of each of the plurality of transportation packets within the electronic file; and
a data field.

11. A method for transferring data between a handheld device and a network over a wireless communication link comprising the steps of:
establishing a communications link between a client and a server;
breaking an electronic file into a plurality of virtual blocks;
creating a virtual datapool comprised of the plurality of virtual blocks;
determining the priority of at least one of the plurality of virtual data blocks;
converting the plurality of data blocks into a plurality of transportation packets; and
controlling the transfer of the plurality of transportation packets between the sender and the receiver; further comprising at least one of the step of:
communicating with an application program residing on the sender; or
communicating with an operating system residing on the sender; or
communicating with an application program residing on the receiver; or
communicating with an operating system residing on the receiver.

12. The method as recited in claim 11, wherein the application program transmits files and instruction commands to the system.

13. The method as recited in claim 11, wherein each of the plurality of transportation packets indicate whether the transportation packet is a data transportation packet or an instruction transportation packet.

14. The method as recited in claim 13, wherein the instruction transportation packets further comprise an instruction field.

15. The method as recited in claim 13, wherein the data transportation packets further comprise:
a field for indicating the electronic file associated with the data transportation packets;
a field for indicating a size of the electronic file associated with each respective data transportation packet;
a field for providing a location of transportation packets within its associated electronic file; and
a data field.

16. The method as recited in claim 11, wherein the system transmits files and instruction commands to the application program.

17. A method for transferring data between a handheld device and a network over a wireless communication link comprising the steps of:
establishing a communications link between a client and a server;
breaking an electronic file into a plurality of virtual blocks;
creating a virtual datapool comprised of the plurality of virtual blocks;
determining the priority of at least one of the plurality of virtual data blocks;
converting the plurality of data blocks into a plurality of transportation packets; and
controlling the transfer of the plurality of transportation packets between the sender and the receiver;
further comprising the step of buffering transportation packets on the receiver.

18. The method as recited in claim 17, wherein the buffering step avoids data duplication by recording a number of consecutive blocks that have been received with respect to a first part of the electronic file.

19. A method for transferring data between a handheld device and a network over a wireless communication link comprising the steps of:
establishing a communications link between a client and a server;
breaking an electronic file into a plurality of virtual blocks;
creating a virtual datapool comprised of the plurality of virtual blocks;
determining the priority of at least one of the plurality of virtual data blocks;
converting the plurality of data blocks into a plurality of transportation packets; and
controlling the transfer of the plurality of transportation packets between the sender and the receiver; wherein each of the plurality of virtual blocks comprises:
a field for indicating a location of each of the plurality of virtual blocks in the electronic file;
a field for indicating whether each of the plurality of virtual blocks is a virtual data block or a virtual instruction block;
a field for identifying the electronic file associated with each virtual bock; and
a field for locating each of the plurality of virtual blocks within the electronic file.

20. A method for transferring data between a handheld device and a network over a wireless communication link comprising the steps of:
establishing a communications link between a client and a server;
breaking an electronic file into a plurality of virtual blocks;
creating a virtual datapool comprised of the plurality of virtual blocks;
determining the priority of at least one of the plurality of virtual data blocks;
converting the plurality of data blocks into a plurality of transportation packets; and
controlling the transfer of the plurality of transportation packets between the sender and the receiver; wherein the controlling step provides an indication of which of the plurality of transportation packets are in transit between the sender and the receiver.

21. A computer program product comprising a computer usable medium having computer readable program code embodied in the medium for transmitting data over a network via a wireless communication link, the computer program product having:

first computer program code for establishing a wireless communications link between a sender and a receiver;

second computer program code for breaking an electronic file into a plurality of virtual blocks;

third computer program code for creating a virtual datapool comprised of the plurality of virtual blocks;

fourth computer program code for determining the priority of at least one of the virtual blocks comprising the virtual datapool;

fifth computer program code for converting the plurality of virtual blocks into a plurality of transportation packets; and sixth computer program code for controlling the transfer of the plurality of transportation packets between the sender and the receiver via the network.

22. The computer program product as recited in claim 21, further comprising eleventh computer program code for transmitting at least one acknowledgment message to the sender upon receiving a transportation packet.

23. The computer program product as recited in claim 21, further comprising twelfth computer program code for indicating whether each of the plurality of transportation packets is a data transportation packet or an instruction transportation packet.

24. The computer program product as recited in claim 23, further comprising thirteenth computer code for:

indicating a location of each of the plurality of virtual blocks within the electronic file;

indicating whether each of the plurality of virtual blocks is a virtual data block or a virtual instruction block;

identifying the electronic file associated with each virtual block; and indicating a location of each virtual block within its associated electronic file.

25. The computer program product as recited in claim 23, further comprising fourteenth computer program code for recording a number of consecutive blocks that have been received with respect to a first part of the electronic file.

26. The computer program product as recited in claim 23, further comprising fifteenth computer program code for:

identifying the electronic file associated with each of the data transportation packets;

indicating a size of the electronic file;

providing a location of each of the plurality of transportation packets with respect to a beginning of their respective electronic file; and a data field.

27. A computer program product comprising a computer usable medium having computer readable program code embodied in the medium for transmitting data over a network via a wireless communication link, the computer program product having:

first computer program code for establishing a wireless communications link between a sender and a receiver;

second computer program code for breaking an electronic file into a plurality of virtual blocks;

third computer program code for creating a virtual datapool comprised of the plurality of virtual blocks;

fourth computer program code for determining the priority of at least one of the virtual blocks comprising the virtual datapool;

fifth computer program code for converting the plurality of virtual blocks into a plurality of transportation packets; and sixth computer program code for controlling the transfer of the plurality of transportation packets between the sender and the receiver via the network; further comprising at least one of:

seventh compute program code for communicating with an application program residing on the sender; or eighth computer program code for communicating with an operating system residing on the sender; or ninth computer program code for communicating with an application program residing on the receiver; or tenth computer program code for communicating with an operating system residing on the receiver.

28. A system for transferring data over a network via a wireless communications link comprising:

means for establishing a wireless communications link between a sender and a receiver;

means for breaking an electronic file into a plurality of virtual blocks; means for creating a virtual datapool comprised of the plurality of virtual blocks;

means for determining the priority of at least one of the virtual blocks comprising the virtual datapool;

means for converting the plurality of virtual blocks into a plurality of transportation packets; and means for controlling the transfer of the plurality of transportation packets between the sender and the receiver over the network; and an application, wherein (1) when an application requests for a file transfer, the system logically chops the file into blocks; and/or (2) an API is provided for the application to specify the portions of the file that have been modified and only those bocks in which there has been a modification are added to the virtual datapool, and only the modified portions of the file are transmitted.

* * * * *

UNITED STATES PATENT AND TRADEMARK OFFICE
CERTIFICATE OF CORRECTION

PATENT NO. : 6,775,298 B1
DATED : August 10, 2004
INVENTOR(S) : Aggarwal et al.

It is certified that error appears in the above-identified patent and that said Letters Patent is hereby corrected as shown below:

Title page,
Item [12], "Aggarwal" should be replaced with -- Aggarwal et al. --.
Item [75], Inventor, "Gaurav Aggarwal, New Delhi (IN)" should read -- Gaurav Aggarwal, Tanveer Afzal Faruquie, Nitendra Rajput, all from New Delhi (IN) --.

Signed and Sealed this

Twenty-fourth Day of May, 2005

JON W. DUDAS
*Director of the United States Patent and Trademark Office*